Oct. 29, 1968          M. M. JOHNSON          3,408,164
PLASMA TREATMENT OF CARBON BLACKS
Filed July 8, 1966                           2 Sheets-Sheet 1

INVENTOR.
M.M. JOHNSON

BY
ATTORNEYS

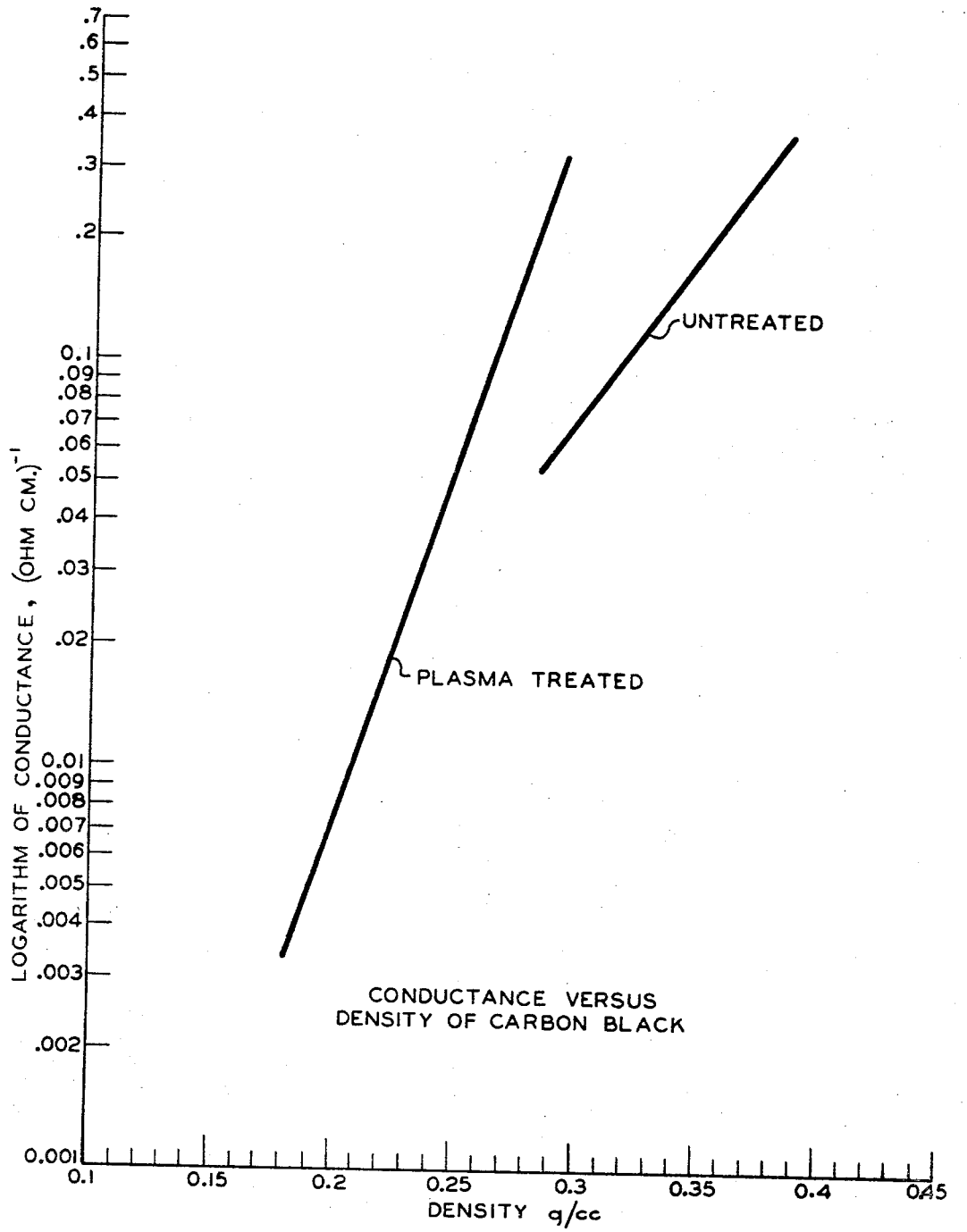

United States Patent Office 3,408,164
Patented Oct. 29, 1968

3,408,164
PLASMA TREATMENT OF CARBON BLACKS
Marvin M. Johnson, Bartlesville, Okla., assignor to Phillips Petroleum Company, a corporation of Delaware
Continuation-in-part of application Ser. No. 232,108, Oct. 22, 1962. This application July 8, 1966, Ser. No. 568,716
11 Claims. (Cl. 23—209.3)

This application is a continuation-in-part of my copending application Ser. No. 232,108, filed Oct. 22, 1962, now abandoned.

This invention relates to the plasma treatment of carbon blacks. In one aspect this invention relates to the plasma treatment of furnace carbon black.

Carbon blacks such as furnace black, channel black, and lamp black are widely used industrially in a wide variety of processes. For many of said processes the quality and properties of the carbon black must be closely controlled. In many instances the processing art has advanced to such a degree that a wide variety of modified types within a particular class of carbon black are needed for different specific uses and purposes. Frequently, the process employed for the most economical production of a general purpose material is not readily adaptable for close quality control of the different modified types within the class of material.

For several years carbon black has been produced in large quantities in furnaces. The larger part of the carbon black produced today is used as a reinforcing agent for rubber. By far the larger part of the compounded rubber material containing carbon black is designed specifically for tire treads or tire carcasses. The state of this rubber compounding art has advanced to such a degree that the quality of the carbon black used in such compounding must be controlled within narrow limits. Such a control of all of the desired properties of the carbon black is oftentimes difficult to achieve.

In controlling the quality of carbon blacks which are to be compounded into rubber, one of the most important properties is the modulus of the finished rubber product. Strictly speaking, "modulus" is not a property of the carbon black itself. However, it is common in the art to refer to "high modulus" carbon black, "low modulus" carbon black, and "normal modulus" carbon black as if "modulus" were a property of the carbon black itself. Generally speaking, furnace carbon blacks are usually considered to be either "normal modulus" or "high modulus" depending upon the modulus value of the particular carbon black being considered. On the other hand, channel blacks are generally considered to be "low modulus" carbon blacks.

Despite the widespread and increasing use of furnace blacks in applications formerly served by channel blacks, there are some uses for which channel blacks are still regarded as superior by some persons skilled in the art. For example, in reinforcing natural rubber products and in specific applications, for example, in non-squeal, soft-riding tires, the low modulus of the channel blacks makes them particularly desirable for such uses. It is thus desirable to furnish the art with a furnace black having properties, particularly modulus properties, comparable to those of channel black. This is particularly so in view of the fact that channel blacks are gradually increasing in cost and being priced out of the market due to increasing cost of the raw natural gas materials from which they are made. The present invention provides a modified furnace black which, since it has a low modulus as compared to prior art furnace carbon blacks, is designated herein as a modified furnace black or one having a lower than normal modulus property when compounded in rubber.

I have now discovered that the properties of carbon blacks can be modified by contacting said materials with a high temperature plasma. Thus, broadly speaking, the present invention resides in a process and apparatus for treating carbon blacks with high temperature plasma; and a plasma treated carbon black product.

A plasma stream can be defined as consisting of neutral gas, ions, and electrons at high temperature and can be produced by passing a suitable gas such as hydrogen, nitrogen, or one of the noble gases, etc., through an arc produced by a high density current between two suitable electrodes in a plasma arc torch. Such a plasma arc torch is capable of generating a plasma stream having temperatures in the range of 5000 to 30,000° F. and higher. Thus, herein and in the claims the terms "plasma," "plasma stream," "plasma flame," and "plasma jet," unless otherwise specified, are used synonymously to connote a material or substance consisting of neutral gas, ions, and electrons existing at a high temperature in an energy state of particle activity above the gaseous state.

An object of this invention is to provide valuable carbon blacks and methods of making the same. Another object of this invention is to provide a process for providing a modified furnace carbon black having properties in rubber comparable to those of channel black and which can be used as a substitute for channel black in the compounding of rubber and other uses. Another object of this invention is to provide a process for producing a modified furnace carbon black having decreased modulus properties in rubber. Another object of this invention is to provide a modified furnace carbon black product and a process for producing same, which product has a decreased modulus property in rubber but yet has a high structure. Another object of this invention is to provide a process for controllably lowering the modulus properties in rubber of a furnace carbon black without also lowering the structure of said carbon black. Another object of this invention is to provide a modified furnace carbon black having an increased electrical conductance and which is suitable for use in dry cell battery mixes. Another object of this invention is to provide a process for regulating and controlling the properties of furnace carbon blacks so as to satisfy prescribed and predetermined requirements for the properties of said carbon blacks. Still another object of this invention is to provide a plasma treated carbon black. Still another object of this invention is to provide a plasma treated furnace carbon black product, made from a given hydrocarbon feedstock, having lower modulus properties in rubber than the carbon black had prior to treatment with said plasma. Other aspects, objects, and advantages of the invention will be apparent to those skilled in the art in view of this disclosure.

Thus, according to the invention, there is provided a process for treating carbon black with plasma, which process comprises: contacting said carbon black with said plasma in a contacting zone; and recovering plasma treated carbon black from the effluent from said contacting zone.

Further according to the invention, there is provided a plasma treated carbon black product produced by treating a carbon black in accordance with the process described in the preceding paragraph.

The actual modulus value imparted to a rubber by a given carbon black will depend upon the type of rubber into which the carbon black is compounded. For example, a given carbon black will impart different modulus values, per se, to natural rubber and to synthetic rubber when blended therein. However, generally speaking, a carbon black which will impart a high, a normal, or a low modulus value to natural rubber will also impart a high, a normal, or a low modulus value to synthetic rubber. For example, commercially available furnace carbon blacks, depending upon the feedstocks from which they are made, when blended in natural rubber usually impart to said rubber, a "normal" 300 percent modulus value in the range of 1600 to 2200 p.s.i. In some synthetic rubbers, e.g., SBR–1000, the corresponding "normal" 300 percent modulus values are in the order of 1200 to 1600 p.s.i. For a typical channel black the "normal" 300 percent modulus value in natural rubber is usually in the order of 1200 to 1600 p.s.i., and in some synthetic rubbers, e.g., SBR-1000, is usually in the order of 800 to 1200 p.s.i.

The modified furnace carbon blacks produced in accordance with the invention are characterized by having lower modulus properties in rubber than the carbon black has prior to treatment. The feedback used for preparing the unmodified carbon black may be one that usually yields a high modulus carbon black, one that usually yields a normal modulus carbon black, or one that usually yields what is generally considered a low modulus carbon black. In any even, the modified carbon black produced in the practice of the invention is characterized by a lower modulus in rubber than it has prior to treatment.

I have found that the modulus of a cured rubber composition compounded with a carbon black treated in accordance with this invention is as much as at least 25 percent lower than the modulus of a like rubber composition cured in the same manner, but compounded with a sample of the same carbon black which has not been treated in accordance with the invention. See Table III hereinafter.

FIGURE 3 is a graph comparing the electrical conductance properties of a furnace carbon black before and after treatment in accordance with the invention.

Figure 1:
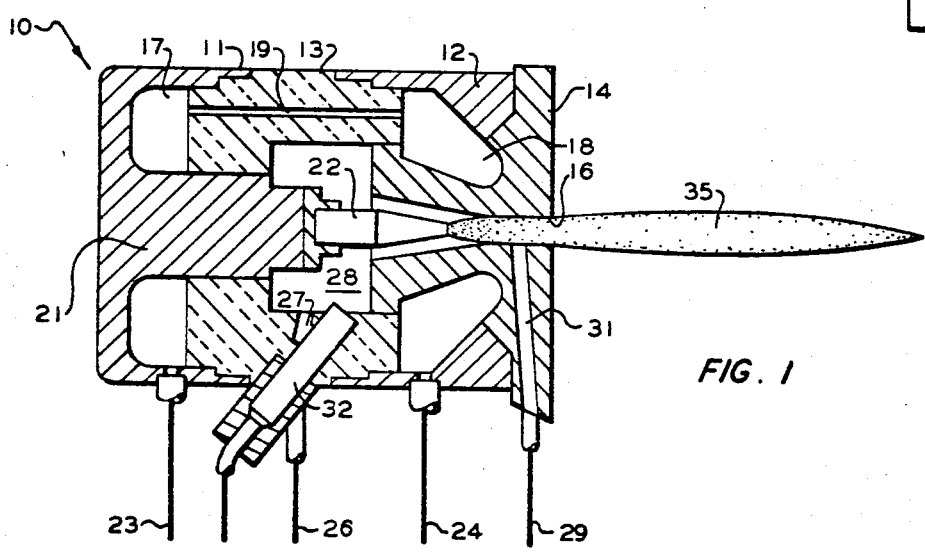
FIGURE 1 is a diagrammatic illustration, partly in cross-section, of one type of plasma torch which can be used in the practice of the invention.

Referring now to said drawings wherein like reference numerals are employed to denote like elements, the invention will be more fully explained. In FIGURE 1 the plasma torch, designated generally by the reference numeral 10, comprises an annular rear housing 11 and an annular front housing 12 separated by an annular insulator member 13, all connected together by suitable connecting means not shown. Front electrode 14 is mounted on said front housing 12 and is provided with a nozzle orifice 16 in the front or outer side thereof. Said nozzle orifice 16 extends inwardly from the outer side of and through said front electrode and flares outwardly with the wall thereof forming a generally V-shaped passage at the rear end of said nozzle orifice. Annular cooling water space 17 is formed between said rear housing 11 and the rear end of said insulator member 13. Annular cooling water space 18 is formed between said front electrode 14 and said insulator member 13 and is defined by said insulator member 13, said front housing 12, and said front electrode 14 including the outer wall of said V-shaped passage. A cooling water passageway 19 connects said cooling water space 17 and said cooling water space 18. An electrode holder 21 extends forwardly from the inner rear wall of said rear housing 11 and has mounted in the forward end thereof a rear electrode 22 which is a tapered electrode as shown and which extends into said V-shaped nozzle passage formed in the after end of front electrode 14. Said front electrode 14 is conveniently made of copper and said rear electrode is conveniently made of thoriated tungsten. However, any other suitable materials can be used to fabricate said electrodes.

A water cooled electrical cable 23 is connected to said rear housing 11. Said cable 23 is of conventional construction and consists of a metal electrical conductor surrounded by an insulation covering material provided with cooling water passages through which cooling water flows into said cooling water cavity 17. When said cable 23 is connected to a source of current, the current flows through said rear housing 11, electrode holder 21, and into rear electrode 22. Cooling water flows from said cable 23 into cooling water cavity 17. Another water cooled electrical cable 24, like said cable 23, is connected into said front housing 12 and provides a discharge connection for cooling water which circulates from cooling water space 17 through passageway 19 and into front cooling water space 18. Arc or plasma forming gas inlet conduit 26 extends through said insulation member 13 via conduit 27 and communicates with space 28 formed between said insulation member 13 and said front electrode 14 and surrounding said rear electrode 22. An injection conduit 29 is connected to injection path 31 provided in and extending through said front electrode 14 to discharge into said nozzle 16.

The above illustration and description of the plasma arc torch 10 is not intended to be a detailed illustration of such a plasma torch. It is only intended to show the essential elements for such a torch. For example, the entire device, with the exception of the outer face of front electrode 14, can be and usually is surrounded with a suitable insulation material.

In the operation of the device illustrated in FIGURE 1, water cooled cable 23 is connected to a suitable source of electrical power and cooling water. The water flowing through said cable flows through cooling water space 17, passage 19, cooling water space 18, and out the water cooled cable 24, the water passage of which is connected to a suitable drain. With cable 23 connected to one lead of a suitable source of electrical current, electrical current will flow through said cable, through rear housing 11, through electrode holder 21, and then to rear electrode 22. The lead of opposite polarity of said source of electrical current is connected to said water cooled cable 24 and is in electrical communication with front electrode 14 by means of front housing member 12. With cooling water flowing through said cooling water spaces as described, a flow of a suitable plasma forming gas is started through gas inlet 26. Said plasma forming gas flows through space 28, the space between said rear electrode 22 and said front electrode 14 and out nozzle orifice 16. After the flow of plasma forming gas has been statred, electrical flow is started through said electrical connections and an arc is struck or started by means of the capacitance starting device 32 or any other suitable means such as a high frequency source of alternating current. Once the arc has been struck it will be maintained by the ionization of at least a portion of the plasma forming gas into plasma which exits from the torch as plasma stream 35.

Plasma flame generators and plasma stream producing devices similar to that described above are known in the art. Thus, the device of FIGURE 1, per se, does not form any part of the instant invention other than when employed in combination with other apparatus elements as described hereinafter. Any suitable plasma stream producing apparatus known in the art can be utilized in the practice of the invention so long as the apparatus will produce a high temperature plasma stream which will modify the properties of carbon black as set forth herein. Examples of other plasma flame generators that can be employed in the practice of the invention are discolsed in U.S. Patent 2,922,869, issued Jan. 26, 1960 to G. M. Giannini et al. and U.S. Patent 2,960,594, issued Nov. 15, 1960 to M. L. Thorpe.

Figure 2:
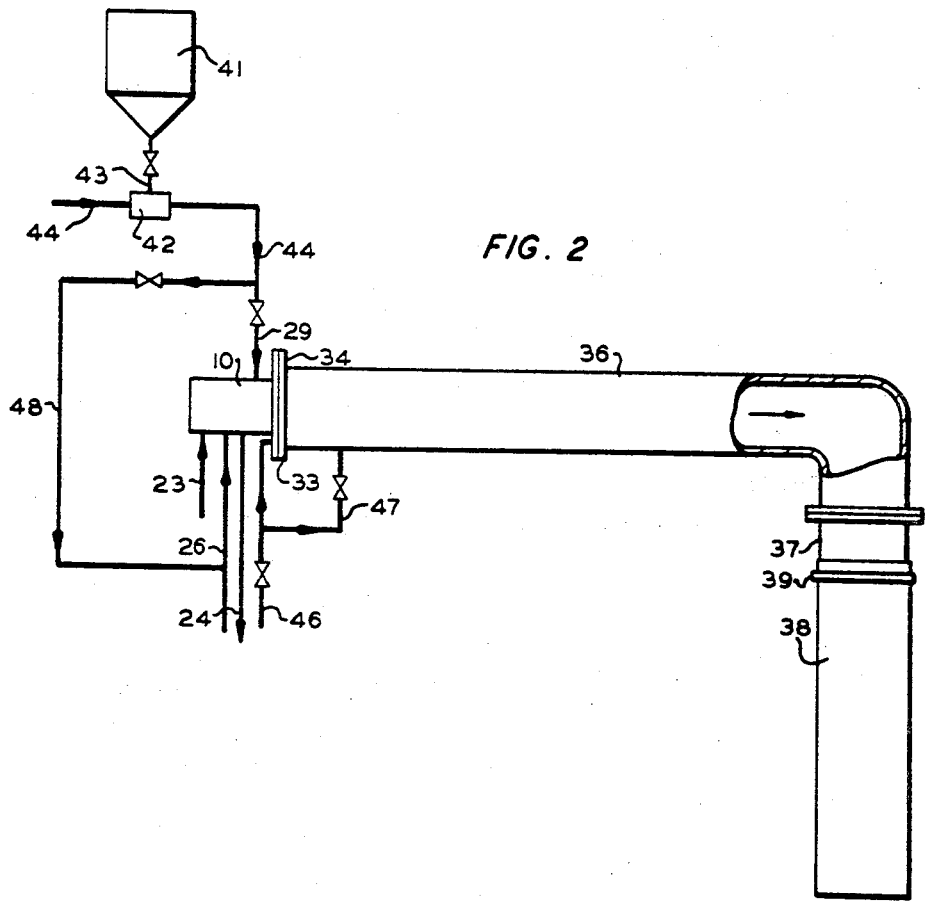
FIGURE 2 is a schematic illustration of one combination of apparatus which can be employed in the practice of the invention.

FIGURE 2 illustrates schematically one combination of apparatus which can be employed in the practice of the invention to modify the properties of carbon black as described herein. The combination apparatus of FIGURE 2 comprises a plasma torch 10, like that illustrated in FIG- URE 1, except that it is provided with a flange member 33 attached to the outer face of front electrode 14. Said flange member 33 is in turn flanged to flange member 34 which is connected to cooling conduit 36. A sleeve 37 is flanged to the end of said cooling conduit 36. A porous glass cloth bag 38 fits over the end of said sleeve member 37 and is held in place thereon by means of a suitable clamp 39. Any other suitable solids separation and collecting means such as a cyclone separator can be utilized in place of said glass cloth bag 38. Hopper 41 is filled with carbon black and is in communication with mixing T or venturi 42 by means of conduit 43. Said mixing T or venturi is positioned in carrier gas supply conduit 44, which is connected to a source of gas, not shown. Said conduit 44 is in turn connected to injection conduit 29. Said carrier gas can conveniently be the same gas as the plasma forming gas which is introduced through conduit 26 as described above. However, any other suitable carrier gas can be employed if desired. The plasma forming gases described hereinafter are examples of suitable carrier gases.

In the operation of the apparatus illustrated in FIGURE 2, the plasma torch 10 is started up as previously described. A flow of carrier gas is then started through conduit 44, mixing T 42, and into injection conduit 29. The valve in conduit 43 is then opened to permit the carbon black to flow into the mixing T 42 where it is mixed with said carrier gas, suspended therein, and the suspension then introduced through injection path 31 into the stream of plasma in nozzle 16. The treated carbon black is discharged from nozzle 16 into cooling conduit 36 from which it passes into collection bag 38. A stream of quench fluid, usually an auxiliary stream of plasma forming gas, can be introduced via conduit 46 and/or conduit 47 into said cooling conduit 36 as a means for aiding in rapidly cooling the effluent material from torch 10 entering said cooling conduit 36. Said quelch fluid can be any suitable fluid such as a gas or liquid, e.g., water.

If desired, instead of introducing the carbon black which is to be treated into the plasma stream through injection conduit 29 and injection path 31, the suspension of material in conduit 44 can be pased via conduit 48 and mixed with the stream of plasma forming gas being introduced into the plasma torch via conduit 26. In this manner, the material being treated is passed through the arc region of the plasma torch and is contacted with the plasma as said plasma is formed and during its passage through nozzle 16. Any other suitable manner for introducing the carbon black to be treated into contact with the plasma can be utilized in the practice of the invention.

Further details of the operation of the apparatus illustrated in FIGURE 2 are given below in connection with Example I.

From the above description of the apparatus illustrated in FIGURE 2 it is to be noted that the carbon black can be contacted with the plasma stream by introducing said material into the arc region where the plasma is being formed, or by injection directly into the plasma stream, as by injection conduit 29 and injection path 31. Injection of the carbon black directly into the formed plasma stream is the presently preferred procedure because a more uniformly treated product is obtained. Referring to FIGURE 1, the water flowing through the cooling water space 18 will cause the wall of front electrode 14 to be cooled. Thus, even if the plasma torch of FIGURE 1 is of a type which develops a vortex flow in the arc region, the carbon black would be subjected to a nonuniform temperature resulting from nonuniform mixing in the region between rear electrode 22 and front electrode 14. In other words, that portion of the plasma which is immediately adjacent the inner wall of the V-shaped passage portion of front electrode 14 will be cooler than the portion of the plasma immediately adjacent rear electrode 22. A more uniform mixing which results in a more uniformly treated product is obtained when the carbon black is introduced directly into the formed plasma stream as through injection path 31. Another reason for preferably not injecting the carbon black through the arc region is that there appears to be some tendency for said carbon black to make the operation of the arc erratic.

Any suitable gas can be used as the plasma forming gas in the practice of the invention. A suitable gas is defined as one which is substantially inert under the treating conditions toward the carbon black being treated, i.e., a gas which is substantially nonreactive with said carbon black under the treating conditions. Oxidizing gases such as oxygen or air or gases which decompose into oxidizing gases must be avoided because they will oxidize the carbon black. Examples of suitable plasma forming gases include hydrogen, nitrogen, and the noble gases helium, neon, argon, krypton, and xenon, and mixtures thereof. Said hydrogen and nitrogen are usually less preferred because a small amount of reaction will sometimes occur between the carbon black and said gases. For example, carbon black reacts with hydrogen under certain conditions to form acetylene which can be recovered from the effluent gases as another product of the process if desired; and nitrogen reacts with carbon black under certain conditions to form cyanogen gas. The conditions required for any appreciable amount of reaction to occur between carbon black and hydrogen or nitrogen include contact times which are greater than the contact times usually employed in the practice of this invention. However, said noble gases are definitely the presently preferred gases because they do not react with carbon black. Of said noble gases, argon is the presently most preferred because it is easily ionized at a low energy level of about 75 watts per cubic foot. Helium requires about 100 watts per cubic foot.

Operating conditions in the plasma torch for forming the plasma with which the carbon black is contacted can be varied over relatively wide ranges. Said operating conditions are interrelated and the value of one operating variable will depend upon the values for other operating variables, the particular type of torch employed, the type of plasma forming gas employed, the amount of treatment desired for the carbon black, etc. For example, for a given plasma forming gas there is a minimum cold gas velocity required for sucessful operation. At velocities below this minimum value flashback will occur. At velocities above said minimum value the arc will be blown out of the nozzle. This condition is known as blow-off. There is also a certain minimum electrical power requirement at the lowest operable gas velocity below which the arc will be unstable and sufficient ionization will not occur. Also, there is a maximum gas velocity which increases somewhat with increasing electric power. Thus, while certain operating conditions are usually preferred in the practice of the invention, depending upon the type of carbon black being treated and the amount of treatment to be effected, the invention is not necessarily limited to any specific ranges of operating conditions.

Any suitable temperature for the plasma stream can be employed. The temperature of the plasma stream used to contact the carbon black will depend primarily upon the power input and the type of plasma forming gas used. Generally speaking, the plasma torches employed in the practice of the invention are operable to produce a plasma stream having a temperature within the range of 5000 to 30,000° F. of higher. Usually the treatment in accordance with the invention is carried out with a plasma stream having a temperature within the range of 7000 to 17,000° F.

The velocity of the injected plasma forming gas also has an effect on the temperature of the plasma stream. Said plasma forming gas is usually passed into chamber 28 at a velocity and/or a pressure sufficient so that it will emerge from the nozzle 16 as a free plasma stream having a velocity of at least 5, and preferably of at least 50 feet per second, and more preferably of at least 500 to 1000 feet per second. Velocities as high as 2000 feet per second and higher can be employed in the practice of the invention.

The amount of plasma forming gas flowing through the plasma torch must also be coordinated with the other operating variables. Said gas flow can be in the order of 10 to 250 cubic feet per hour (measured at standard conditions) depending upon the particular plasma forming gas used and the configuration and size of the electrodes and nozzle. It will be evident in view of this disclosure that the amount of plasma forming gas will always be sufficient to supply an excess of plasma with respect to the carbon black being treated.

The actual power requirements for the plasma torch will depend upon the size of the torch and its structural design, the gas flow (both amount and velocity), and the temperature desired for the plasma stream. Ordinarily, the voltage impressed between the front electrode and the back electrode is in the range of 20 volts to 500 volts so as to effect a current flow between said electrodes in the range of 20 amperes to 2000 amperes.

Further details regarding the coordination of the various operating variables in the operation of plasma torches can be found in said Thorpe patent and said Giannini et al. patent, referred to above.

As indicated above, the various operating variables must be coordinated. The actual choice of value for each variable will be governed primarily by (1) the necessity for stable operation of the plasma torch, (2) the type of carbon black being treated, and (3) the amount of treatment desired. Generally speaking, it is desirable that operating conditions be coordinated so that the plasma torch converts a high percentage of the plasma forming gas into the actual plasma. It will be evident to those skilled in the art that one can choose operating conditions which will produce a plasma stream having a temperature above the sublimation temperature of carbon black. The temperature of the plasma stream can be readily determined, either by measurement or by calculation when the amount, velocity, and type of plasma forming gas and power input to the plasma torch are known.

Generally speaking, the temperature of the plasma stream will nearly always be above the sublimation temperature of the carbon black being treated. For example, amorphous carbon sublimes at 6444–6477° F. This does not necessarily mean, however, that any substantial portion of the carbon black being treated will be sublimed. Whether or not the temperature attained by the particles of carbon black being treated will be sufficient to sublime same will depend upon the contact or residence time, i.e., the period of time said carbon black is exposed to the high temperature of the plasma stream. Said contact time will vary with (a) the size of the particle, (b) the density of the particle, (c) the viscosity of the plasma stream and (d) the velocity of the plasma stream. Thus, as will be evident to those skilled in the art, the calculation of the contact time is a calculation involving Stokes law.

Usually, there is no need to actually determine or calculate the contact time because the desired contact time can be readily determined empirically from the change in properties of the treated product. Thus, when one has coordinated the other operating variables to obtain stable operation of the plasma torch to deliver a plasma stream of a given temperature, the contact time can be chosen in accordance with the type of carbon black to be treated and the desired amount of treatment to be effected. In all instances, the contact time will be what is normally considered to be an extremely short period of time, e.g., in the order of milliseconds or less. Generally speaking, said contact time will be in the order of 0.0001 to 0.01 second, generally less than 30 milliseconds. It is presently preferred that the contact time be insufficient to cause sublimation of more than a small amount, if any, of the carbon black. However, it is within the scope of the invention to employ contact times sufficient to sublime a substantial portion or even all of the carbon black and then condense same if a product having the properties of such a severely treated material is desired.

The carbon black feed material is in a finely divided state, the particle size preferably being as small as at least 100 mesh and more preferably finer than 300 mesh (U.S. series). In the practice of the invention, said finely divided material can be suspended in the carrier gas in any amount sufficient to form a suitable suspension for treatment in accordance with the invention, as an example, when utilizing a plasma torch of the type described in Example I hereinafter, carbon black can be suspended in the carrier gas in an amount of from 1 to 20 grams per cubic foot, or more.

The following examples will serve to further illustrate the invention.

Example I

The carbon black treating apparatus was assembled essentially as illustrated in FIGURE 2. The plasma arc torch 10 (Plasmadyne Model SG–1, water cooled, 5/16 inch orifice, copper and tungsten electrodes) was flange mounted to an approximately 36-inch section of 4-inch diameter Pyrex pipe which served as cooling conduit 36. A glass-cloth collection bag 38 was secured to the end of the pipe. The torch was fitted with an argon flow of 0.8 cubic feet per minute through conduit 26 and an auxiliary argon flow of 1.0 cubic foot per minute through conduit 47, both gas flows measured at standard conditions. The arc was started with a radio frequency discharge which initially ionized a portion of the gas. The torch was then self-sustaining. During a period of about 94 minutes, 158 grams of Philblack A, a commercial FEF carbon black (fast extruding, medium abrasion furnace carbon black), was injected into plasma stream 35 via injection conduit 29 and injection path 31 while suspended in an argon carrier gas flowing at a rate of 0.5 c.f.m. (S.C.). The torch was operated at 27 volts and 400 amps. The temperature of the plasma stream prior to injection of said suspension of carbon black was calculated to be about 17,250° R. and the temperature of the mixture of plasma and suspension was calculated to be about 12,250° R. The contact time was estimated to be about 0.0005 second. The reactor effluent was partially quenched by mixing with said auxiliary argon gas and was further cooled by radiation and convection to the glass wall. A 130 gram quantity of treated carbon black was recovered from the pipe and the collection bag. The difference between charge and yield carbon black was due to mechanical losses. In other similar runs, the treatment has been found to be essentially quantitative. The plasma treated carbon black was examined and the results of tests thereon compared to tests on the untreated material. The data are given in Table I below.

TABLE I

| Composition, percent by wt. | Philblack A (FEF Carbon Black) | |
|---|---|---|
| | Untreated | Plasma Treated |
| Carbon | 98.50 | 99.13 |
| Hydrogen | 0.38 | 0.27 |
| Sulfur | 0.55 | 0.50 |
| Nitrogen | 0.20 | 0.10 |
| Remainder (O, $H_2O$ and Ash) | 0.37 | 0.00 |
| | 100.00 | 100.00 |
| $N_2$ surface area, sq. m./g | 45 | 46 |
| Average particle size, A | 384 | 300 |
| Benzene extractable, wt. percent | 0.35 | 0.17 |

The above data show that when treated in accordance with the invention there was a loss of hydrogen, oxygen, and nitrogen from the carbon black. There was also a decrease in benzene soluble oils and tars. Surprisingly, in view of the other changes, there was little change in sulfur content or surface area.

Example II

Two other runs were carried out in essentially the same manner as described above in Example I. In one of these runs another sample of the commercial FEF carbon black was treated with the plasma stream. In the other of said runs a sample of Philblack E, a commercial SAF carbon black (super abrasion furnace carbon black), was treated with the plasma stream. Tests on the treated and untreated carbon blacks are given in Table II below.

TABLE II

| Composition percent by wt. | Philblack A (FEF carbon black) | | Philblack E (SAF carbon black) | |
| --- | --- | --- | --- | --- |
| | Untreated | Plasma Treated | Untreated | Plasma Treated |
| Carbon | | | 96.12 | 98.79 |
| Hydrogen | | | 0.56 | 0.24 |
| Sulfur | | | 0.53 | 0.32 |
| Nitrogen | | | 0.16 | 0.09 |
| Remainder [1] | | | 2.63 | 0.56 |
| | | | 100.00 | 100.00 |
| N₂ surface area, sq. m./g | 45 | 46 | 142 | 137 |
| Oil absorption, ml./g | 1.38 | 1.56 | 1.35 | 1.55 |
| pH | 8.7 | | 8.3 | 9.8 |
| Benzene extractable, wt. percent | 0.30 | 0.17 | 0.30 | 0.10 |

[1] As in Table I.

Example III

The plasma treated carbon blacks prepared in Example II and the corresponding untreated carbon blacks were compounded into rubber to produce rubber compositions. The rubber used was Philprene 1000, SBR-1000 rubber prepared by emulsion polymerization of butadiene and styrene at approximately 122° F. and containing 22.5 to 24.5 weight percent bound styrene. The compounding recipes employed were as follows:

| | Parts by weight | |
| --- | --- | --- |
| | FEF blacks | SAF blacks |
| Rubber | 100 | 100 |
| Carbon black | 50 | 40 |
| Zinc oxide | 3 | 3 |
| BRT No. 7 [1] | 6 | 6 |
| Sulfur | 1.75 | 1.75 |
| Santocure [2] | 0.8 | 0.9 |

[1] A rubber softener—a refined tar with a high free carbon content and having a specific gravity of 1.20 to 1.25, available from Allied Chemical and Dye Corp.
[2] N-cyclohexyl-2-benzothiazylsulfonamide.

Said rubber compositions were each cured to a finished rubber by curing at 307° F. for 30 minutes. The cured rubber compositions were tested in accordance with standard rubber testing procedures. Tests on said rubber compositions are set forth in Table III below.

TABLE III.—EVALUATION OF CARBON BLACKS IN RUBBER

| Property | Philblack A (FEF carbon black) | | Philblack E (SAF carbon black) | |
| --- | --- | --- | --- | --- |
| | Untreated | Plasma Treated | Untreated | Plasma Treated |
| Compounded Mooney, MS-1½ at 212° F | 34.1 | 34.0 | 35.8 | 42.0 |
| Crosslinking, a ×10⁴ mols/cc | 0.98 | 1.93 | 1.64 | 1.68 |
| Compression set, percent | 18.8 | 18.8 | 20.1 | 18.8 |
| 300% Modulus, p.s.i. | 1,650 | 1,560 | 1,440 | 1,060 |
| Tensile, p.s.i. | 2,340 | 2,640 | 3,600 | 3,890 |
| Elongation, percent | 410 | 485 | 515 | 600 |
| Properties after aging 24 hrs. at 212° F.: | | | | |
| 300% Modulus, p.s.i. | 2,250 | 2,000 | 2,250 | 1,650 |
| Tensile, p.s.i. | 2,300 | 2,370 | 3,270 | 3,500 |

The above data show that a very significant decrease in the modulus of the SAF carbon black occurred. There was also an increase in tensile strength and an increase in elongation for the rubber compositions containing said treated SAF carbon black. Similar but less pronounced changes occurred in the rubber composition containing the treated FEF carbon black. These changes in rubber properties, particularly the change in modulus, were surprising in view of the decrease in oxygen content of the treated carbon black. It has been generally considered in the prior art that an increase, not a decrease, in oxygen content of carbon blacks (particularly furnace carbon blacks) will cause a reduction in modulus. It was thus surprising that the non-oxidizing process of the invention effected a reduction in modulus.

It should also be noted that the decrease in modulus was accomplished without a corresponding decrease in structure of the treated carbon black. This is shown by the oil absorption values given above in Table II. It is to be noted that the oil absorption values for both the treated FEF black and the treated SAF black were greater than the values for the corresponding untreated blacks. These oil absorption values denote a "high structure" carbon black. The combination of an increase in structure with a decrease in modulus is unusual.

By the term "structure," as applied herein to carbon black, is meant characteristics of the carbon black particles which relate to flocculation of said particles. The structure is said to be high when there is a strong tendency for the particles to form chains of particles. Conversely, the structure is said to be low when there is little tendency to form such chains. "High structure" carbon black is generally considered to have an oil absorption of about 1.35 to 1.45 cc. per gram and this is the usual range for prior art furnace blacks. "Normal structure" carbon black is generally considered to have an oil absorption of about 0.75 to 1.2 cc. per gram and in the prior art such blacks have generally been made by the channel black process. "Low structure" carbon black is generally considered to have an oil absorption of about 0.45 to 0.55 cc. per gram and in the prior art such blacks are made by the thermal decompositon process.

Since it is not convenient to measure the structure directly, the oil absorption of the black is commonly used as a "measure" of the structure. Oil absorption is measured by adding oil a few drops at a time to a one gram sample of carbon black on a mixing stone or glass plate. After each addition the oil is incorporated thoroughly with a spatula, using moderate pressure. Tiny pellets are formed, gradually increasing in size as more oil is added. The end point, approached one drop of oil at a time, is reached when a single ball of stiff paste is formed. The results are reported as cc. oil per gram of black, or converted to gallons of oil per 100 pounds of black. Measurement of oil absorption gives a quick reliable measure of the structure of the carbon black. It is thus possible to obtain a rapid measure of one of the most important properties of carbon black insofar as rubber compounds prepared with said carbon black are concerned.

Usually there is a close correlation between the structure of a carbon black and the modulus of a rubber product compounded with said carbon black. Other properties being comparable, high structure carbon blacks normally yield a high modulus rubber and low structure carbon blacks normally yield a low modulus rubber. It was thus surprising that the treated carbon blacks of the invention have a decreased modulus and an increased structure. This combination of properties provides an easy processing carbon black which can be quickly and easily compounded into rubber. Many processes for decreasing the modulus of furnace carbon blacks, such as incorporating a substance comprising an alkali metal into the feedstock, yield a carbon black having a decreased structure which is difficult to compound into rubber. This is not true of the modified carbon blacks produced in accordance with this invention.

Example IV

X-ray diffraction analysis of the plasma treated SAF carbon black from Example II showed a change in crystallite dimensions. The crystallite height was increased and the layer spacing between planes was decreased by the plasma treatment.

These changes in crystallite dimensions resulted in increased electrical conductance in the plasma treated carbon black making it suitable for use in dry cell battery mixes where a more conductive carbon black is required. The conductance of the plasma treated SAF carbon black was determined at different densities (degree of compaction) and compared with the conductance of the untreated SAF carbon black at different densities. The results of these determinations are shown graphically in FIGURE 3. Referring now to said FIGURE 3, a comparison at the common density of 0.29 gram per cc. shows that the conductance of the plasma treated carbon black is 0.28 (ohm cm.)$^{-1}$, or nearly five times the value of 0.059 for the untreated carbon black. Said data show that for a given amount of carbon black per unit volume the conductance of the carbon black has been increased. It would, therefore, take less of the treated carbon black in a given battery mix. The conductance values for the untreated carbon black sample could not be determined in the lower ranges of density values because they were below the natural density of said carbon black.

While the invention has been described with particular reference to furnace carbon blacks because it is particularly adapted for the treatment of furnace carbon blacks, the invention is not so limited. The invention is applicable to any type of carbon black. Included among the carbon blacks which can be treated in accordance with the invention are the various furnace blacks, impingement or channel blacks, lamp blacks, thermal blacks, etc. Formerly the term "furnace black" and "furnace carbon black" have sometimes been defined broadly enough to include all types of carbon blacks produced in a furnace, as contrasted to the impingement or channel blacks, and included furnace combustion blacks produced by the partial combustion of hydrocarbons in a furnace, furnace thermal blacks produced by the thermal decomposition of hydrocarbons in a preheated furnace, and lamp blacks produced by burning liquid fuels in specially designed burning pans in a furnace or stove. However, in recent years, there has been a growing trend to restrict said terms "furnace black" and "furnace carbon black" to furnace combustion blacks, i.e., those carbon blacks produced by the partial combustion of hydrocarbons in a furnace. Thus, herein and in the claims, unless otherwise specified, said terms "furnace black" and "furnace carbon black" refer to furnace combustion blacks as defined above. This definition is believed to be more accurate and more nearly in accord with present usage in the art.

Examples of said furnace carbon blacks which are particularly adapted to be modified in accordance with the present invention include those produced by the tangential flame processes described in U.S. Patents 2,375,795; 2,375,796; 2,375,797; 2,375,798; and the process of U.S. Patent 2,564,700, and other improvement patents describing said processes. For example, Philblack A and Philblack E described above can be produced by the processes of one or more of the preceding patents. Still other furnace blacks which can be modified in accordance with the invention are those produced by the processes described in U.S. Patents 2,368,828; 1,807,321; 2,378,055; 2,440,423; and 2,440,424.

While certain embodiments of the invention have been described for illustrative purposes, the invention obviously is not limited thereto. Various other modifications will be apparent to those skilled in the art in view of the disclosure. Such modifications are within the spirit and scope of the invention.

I claim:

1. A process for treating a previously formed carbon black with plasma so as to modify at least one property of said carbon black, which process comprises: forming a stream of said plasma; passing said carbon black into contact with said plasma in a contacting zone; and recovering plasma treated carbon black from the effluent stream from said contacting zone.

2. The process of claim 1 wherein said carbon black is introduced into said stream of plasma to form a mixture.

3. The process of claim 1 wherein said carbon black is passed into contact with said plasma as said plasma is being formed and a mixture is formed.

4. The process of claim 1 wherein a suspension of said carbon black is formed in a carrier gas and said suspension passed into contact with said plasma.

5. A process according to claim 1 wherein said carbon black is a furnace carbon black.

6. A process according to claim 2 wherein said carbon black is a furnace carbon black.

7. A process according to claim 3 wherein said carbon black is a furnace carbon black.

8. A process according to claim 4 wherein said carbon black is a furnace carbon black.

9. A process according to claim 8 wherein said carbon black is treated with said plasma so as to decrease the modulus of said carbon black, a stream of argon is passed through a plasma generating zone to form said plasma, said carrier gas is argon and, following introducing the suspension into contact with the plasma, the resulting mixture is passed through a cooling zone.

10. A process according to claim 4 wherein said carbon black is treated with a high temperature plasma, said stream of said plasma is formed by passing a stream of plasma forming gas through a plasma generating zone, and following passing said suspension into contact with said plasma, the resulting mixture is passed through a cooling zone.

11. The process of claim 10 wherein said carbon black is a furnace carbon black and is treated so as to decrease the modulus of said carbon black.

References Cited

UNITED STATES PATENTS 2,922,869  1/1960  Giannini et al. _____ 219—75
3,009,783  11/1961  Sheer et al. _____ 23—209.3

EDWARD J. MEROS, *Primary Examiner.*